United States Patent [19]

Carnagie et al.

[11] Patent Number: 4,914,920
[45] Date of Patent: Apr. 10, 1990

[54] DEVICE FOR HEATING AND COOLING A BEVERAGE

[75] Inventors: Jeffrey C. Carnagie, Owenton, Ky.; Robert Strauch, Dearborn Heights, Mich.

[73] Assignee: Q-Branch Technologies, Inc., Dearborn Heights, Mich.

[21] Appl. No.: 213,348

[22] Filed: Jun. 30, 1988

[51] Int. Cl.⁴ .............................................. F25B 21/02
[52] U.S. Cl. .................................. 62/3.3; 62/457.9
[58] Field of Search ........................ 62/3, 3.3, 457.9

[56] References Cited

U.S. PATENT DOCUMENTS

| | | | |
|---|---|---|---|
| 2,991,628 | 7/1961 | Tuck | 62/3 |
| 3,178,896 | 4/1965 | Sandsto | 62/3 |
| 3,214,922 | 11/1965 | Koblischek | 62/3 |
| 3,310,953 | 3/1967 | Rait | 62/3 |
| 3,314,242 | 4/1967 | Lefferts | 62/3 |
| 3,402,561 | 9/1968 | Mahoney | 62/3 |
| 3,713,302 | 1/1973 | Reviel | 62/3 |
| 3,808,825 | 5/1974 | Ciurea | 62/3 |
| 3,858,106 | 12/1974 | Launius | 62/3 X |
| 4,384,512 | 5/1983 | Keith | 62/3 X |
| 4,671,070 | 6/1987 | Rudick | 62/3 |

*Primary Examiner*—Lloyd L. King
*Attorney, Agent, or Firm*—Schiller, Pandiscio & Kusmer

[57] ABSTRACT

A device for actively maintaining the temperature of a beverage in a container has a housing with a compartment that is configured to receive the beverage container. A solid state heat pump that is mounted to the housing is selectively energized to provide either a heating or cooling environment in the compartment for controlling the beverage temperature.

12 Claims, 3 Drawing Sheets

DEVICE FOR HEATING AND COOLING A BEVERAGE

FIELD OF THE INVENTION

The present invention relates to devices for heating and cooling and, more particularly, is directed towards a portable device for actively heating and cooling a beverage in a container.

BACKGROUND OF THE INVENTION

The prior art is replete with portable evacuated bottles and insulated containers of various configurations for passively maintaining the temperature of beverages, either hot or cold. Eventually, the temperature of a hot beverage cools down to an unsatisfactory level and the temperature of a cold beverage becomes too warm. A need exists for a system which actively cools cold beverages and actively heats hot beverages.

SUMMARY OF THE INVENTION

It is an object of the present invention to provide a device for controlling the temperature of a beverage in a container.

Another object of the present invention is to provide a portable device for actively heating and cooling a beverage within a container.

These and other objects of the invention are achieved by a beverage temperature control device having a housing with a compartment that is configured to receive a beverage container. A heat pump mounted within the housing is selectively energized to maintain a specified temperature range in the compartment. Temperature sensors sense the temperature in the compartment and control the on-off cycling of the heat pump for maintaining the temperature of the beverage. A fan mounted to the housing supplements the heating and cooling process.

The invention accordingly comprises the apparatuses, devices and systems, together with their parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
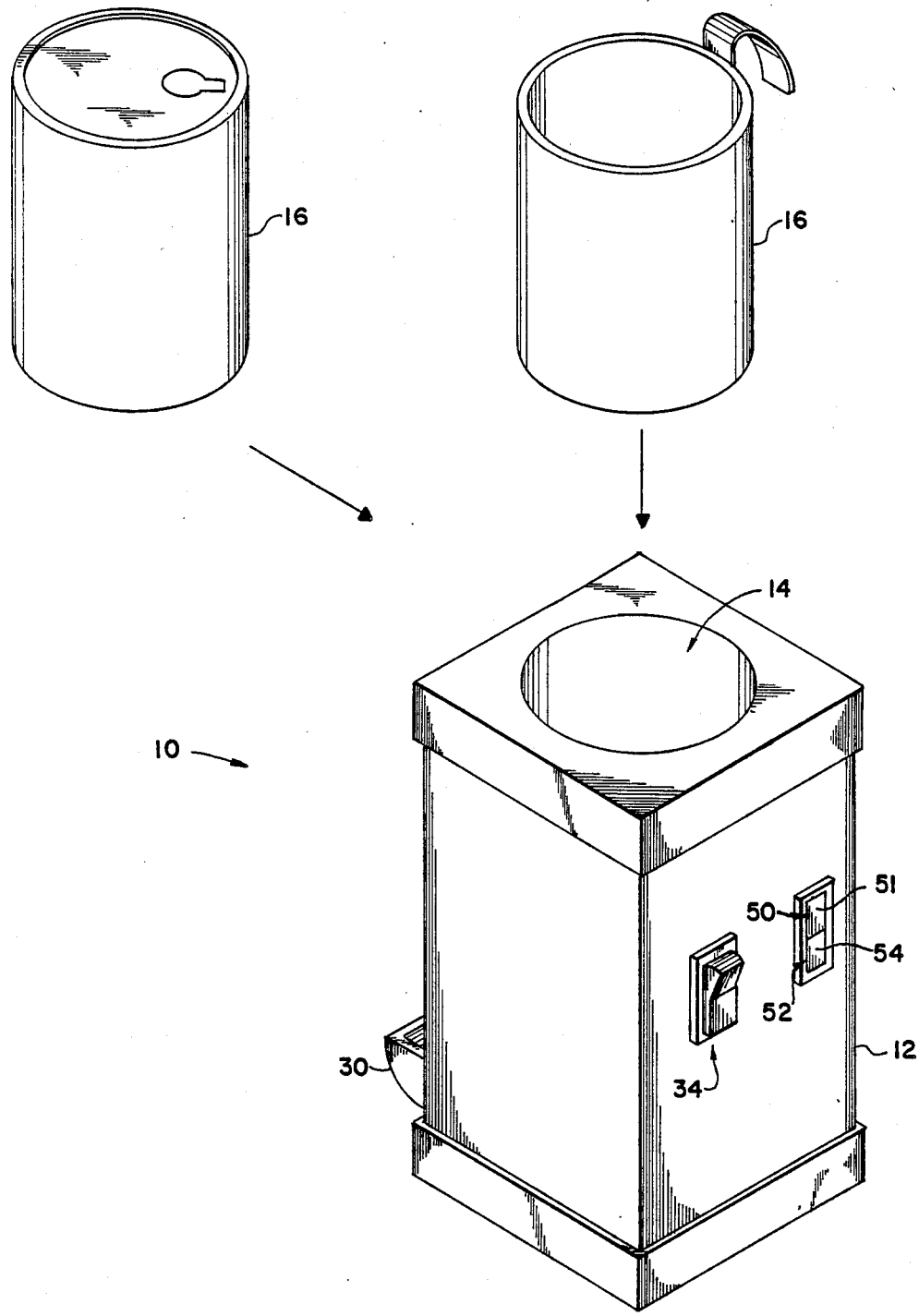
FIG. 1 is a perspective view of a beverage heating and cooling device embodying the invention.
Figure 2:
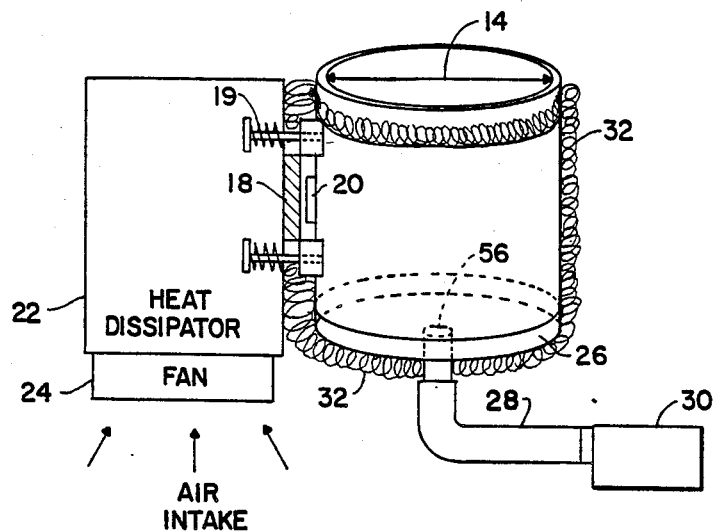
FIG. 2 is a side view, in a somewhat schematic format, of the heating and cooling device of FIG. 1.

Referring now to the drawings, particularly FIGS. 1 and 2, there is shown a beverage temperature control device 10 embodying the present invention for heating and cooling a beverage. Temperature control device 10 includes a housing 12 having a compartment 14 that is configured to receive a beverage container 16, for example a custom container or a standard 12-ounce can. A heat pump 18, for example a solid state heat pump such as the solid state heat pump sold by Material Electronic Products Corp., catalog number CP 1.0-127-06L, is mounted to housing 12 adjacent to compartment 14. Heat pump 18 is mounted in a free-floating manner by means of springs 19 as shown in FIG. 2. Heat pump 18 has mutually exclusive heating and cooling cycles for heating and cooling a beverage in the beverage container 16. A temperature sensor 20, which is responsive to temperature changes in the compartment 14, is interposed between heat pump 18 and the compartment. As hereinafter described, temperature sensor 20 selectively controls the heating and cooling cycles of heat pump 18 as a function of the temperature in compartment 14. Temperature sensor 20, which can be fixed at a particular temperature or adjustable over a temperature range, is thermally bonded to compartment 14 near heat pump 18. This prevents pump 18 from overheating, extends its life and insures reliable performance. Furthermore, temperature sensor 20 provides a means for controlling the maximum temperature of the beverage.

A heat dissipator 22 is mounted to housing 12 adjacent to heat pump 18. Heat dissipator 22 dissipates the heat generated by heat pump 18 during the heating and cooling cycles. A fan 24, which is mounted to housing 12, is positioned to direct a stream of air towards dissipator 22 for cooling the dissipator. A drain 26 is provided at the bottom of compartment 14 for removing any condensation or spillage in the compartment. In the illustrated embodiment, drain conduit 28 is connected from drain 26 to a drain collection tray 30 that is mounted to housing 12. In an alternative embodiment, drain conduit 28 and drain collection tray 30 are omitted. As noted in FIG. 2, compartment 14 is surrounded by insulation 32. A thermally conductive grease (not shown) is applied between heat dissipator 22 and heat pump 18, and between temperature sensor 20 and heat pump 18.

As hereinafter described, when current flows through heat pump 18 in a first direction, the heat pump operates in a heating mode. When current flows in a second direction that is opposite the first direction the heat pump operates in a cooling mode. Reversing of the current to heat pump 20 is accomplished by means of a switch 34, for example a rocker switch, shown in FIGS. 1 and 3.

Figure 3:
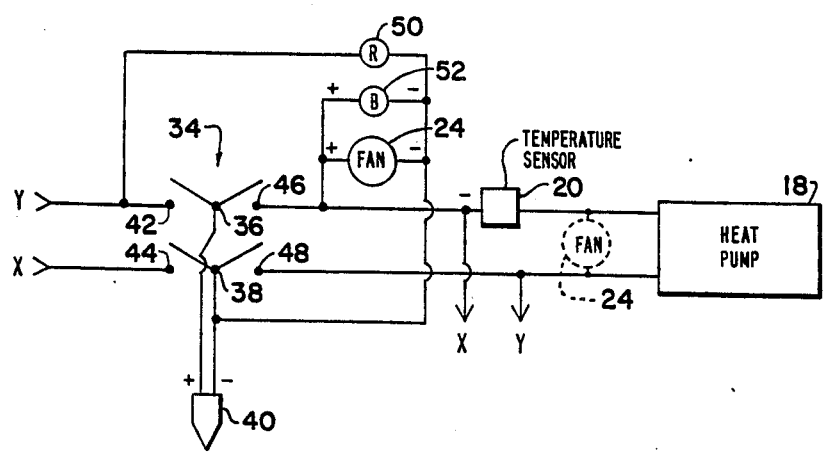
FIG. 3 is a block and schematic diagram of the heating and cooling device of FIG. 1.

Referring now to FIG. 3, it will be seen that switch 34 includes common terminals 36 and 38 that are connected to a plug 40, for example a male plug that is configured to fit into the cigarette lighter socket of an automobile. Switch 34 also includes a pair of switching contacts 42, 44 and a pair of switching contacts 46, 48. Switching contacts 42 and 44 are used for the heating cycle and switching contacts 46 and 48 are used for the cooling cycle. Switching contact 42 is connected to one terminal of a lamp 50, for example, a lamp having a red lens 51. Switching contact 46 is connected to one terminal of a lamp 52, for example a lamp with a blue lens 54. Switching contact 46 is also connected to one terminal of fan 24 and one terminal of temperature sensor 20. Another terminal of temperature sensor 20 is connected to one terminal of heat pump 18. Another terminal of heat pump 18 is connected to contact 48. The other terminals of lamps 50, 52 and fan 24 are connected to terminal 38. In an alternative embodiment, fan 24 is connected across the input terminals of heat pump 18 as shown by the dashed lines in FIG. 3.

In the preferred embodiment, compartment 14 is configured to receive a 12-ounce beverage can or custom-made mug, compartment 14 having a diameter of approximately 3.75 inches. Compartment 14 is composed of aluminum. In one embodiment, the bottom 0.5 inch of compartment 14 is composed of a thermoplastic material and is slightly slanted downwardly toward the center to form drain 26 (see FIG. 2). A 0.25 inch hole 56 at the bottom of drain 26 is connected to tubing 28 to provide a convenient means for removing condensation buildup and spillage in compartment 14. Furthermore, drain 26 serves as a vent and prevents creation of a partial vacuum when container 16 is in compartment 14. The venting of compartment 14 facilitates entry and removal of the beverage container 16 or mug from compartment 14. In one embodiment, the top 0.25 inch of compartment 14 is composed of thermoplastic material that functions as an insulator and the top edge of compartment 14 is optionally bevelled to facilitate insertion of the beverage container 16. The section of compartment 14 between the top and bottom thermoplastic areas is composed of aluminum and has an inner diameter of 2.615 inches and a wall thickness of 0.25 inch. It is to be understood that, in alternative embodiments, a thermal conducting material other than aluminum is used for the intermediate section of compartment 14.

In operation of the temperature control device 10 during the heating mode, switch 34 is moved so that common terminals 36 and 38 are connected to switching contacts 42 and 44, respectively. Red light 50 is energized and a negative voltage is applied through temperature switch 34 to heat pump 18. In operation of the cooling cycle, switch 34 is positioned so that common terminals 36 and 38 are in contact with switching contacts 46 and 48, respectively. Blue lamp 52 and fan 24 are energized. A positive voltage is applied to heat pump 18 through temperature switch 34.

When the cooling cycle is activated and heat pump 18 is turned-on, energy in the form of heat is pumped from the beverage within the beverage container 16 through the container walls and through the thermally conductive intermediate section of compartment 14 to heat dissipator 22. Fan 24 blows air through heat dissipator 22 and aids in the cooling process. As previously indicated, compartment 14 is well insulated from heat dissipator 22 and the surrounding environment. Temperature sensor 20 senses the temperature in compartment 14 and cycles the heat pump 18 on and off for cooling the beverage to a selected temperature and from maintaining the beverage at that temperature.

When the heating cycle is initiated by moving switch 34 so that terminals 36 and 38 are in contact with switching contacts 42 and 44, respectively, heat is applied to the beverage within the beverage container 16. The direction of current flow through pump 18 is reversed from the direction of current flow in the cooling cycle. Heat pump 18 generates heat which passes through the thermally conductive intermediate section of compartment 14 to the beverage container 16 and its contents. Temperature sensor 20 senses the temperature in compartment 14 and cycles the heat pump 18 on and off for heating the beverage to a selected temperature and for maintaining the beverage at that temperature.

Figure 4:
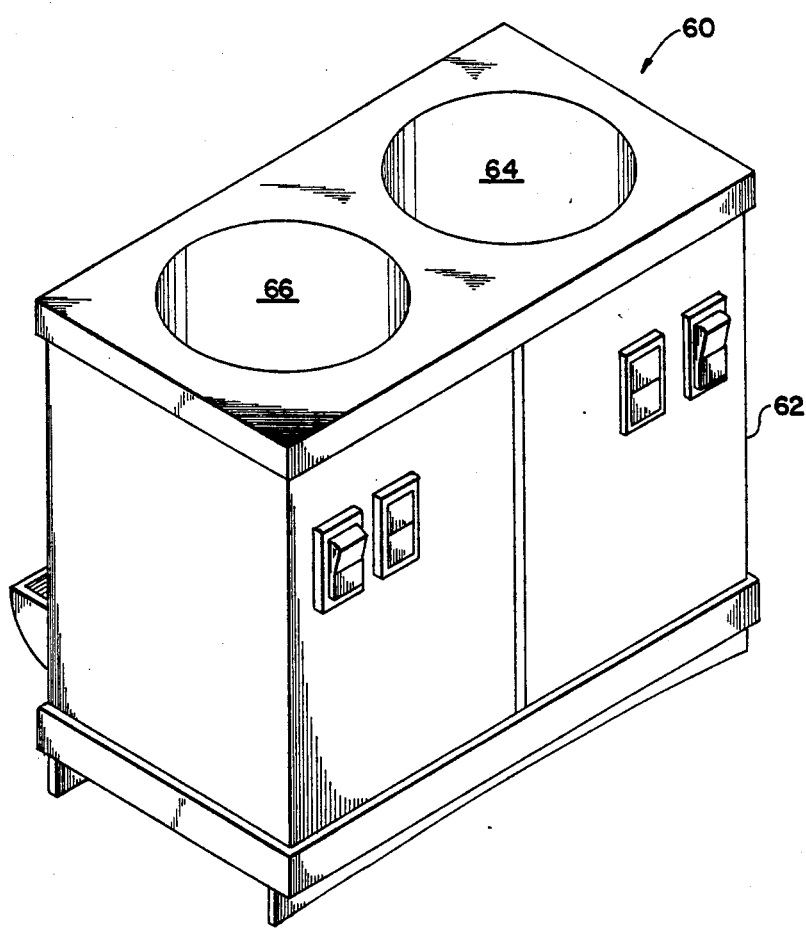
FIG. 4 is a perspective view of a multiple compartment beverage heating and cooling device embodying the invention.

Referring now to FIG. 4, there is shown an alternative embodiment of the invention in the form of a multiple compartment beverage temperature control device 60. Multiple compartment temperature control device 60 includes a housing 62 having compartments 64 and 66, each compartment being configured to receive a beverage container 16. The electronic components and circuitry of temperature control device 60 are similar to the components and circuitry described in connection with temperature control device 10. Although compartments 64 and 66 are separately controlled, in the preferred embodiment, they share the same power source, heat pump, heat dissipator and fan. In another embodiment, the number of compartments is other than two, for example three or four or some other number. Appropriate changes are made in the components and circuitry to accommodate the added compartments.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A device for actively heating and cooling a beverage in a beverage container, said device comprising:
    (a) a housing with at least one compartment that is closed at its bottom and sides and is opened at its top, said compartment configured to receive a beverage container, an intermediate portion of said compartment being composed of a thermoconductive material;
    (b) heat pump means mounted in said housing, said heat pump means having mutually exclusive heating and cooling cycles for selectively heating and cooling a beverage in the beverage container, thermal energy being transferred between said heat pump means and the beverage container via said thermoconductive material;
    (c) switch means connected to said heat pump means for selectively energizing said heat pump means into said heating and cooling cycles; and
    (d) temperature sensor means responsive to temperature changes, said temperature sensor means connected to said heat pump means for controlling the temperature in said compartment and selectively controlling energization of said heat pump means for controlling the heating and cooling cycles as a function of the temperature in said compartment.

2. A device according to claim 1, wherein said heat pump means is a solid state heat pump.

3. A device according to claim 1, wherein said device includes heat dissipating means mounted in said housing adjacent said heat pump means for dissipating heat generated by said heat pump means during said heating and cooling cycles.

4. A device according to claim 3, wherein said device includes a fan mounted to said housing for directing air at said heat dissipating means for dissipating heat dissipated by said heat dissipating means.

5. A device according to claim 4, wherein said device includes a drain and a vent at the bottom of said compartment for draining fluid in said compartment and for preventing creation of a partial vacuum when the beverage container is placed in said compartment.

6. A device according to claim 5, wherein said device included collection means connected to said drain for collecting the fluid drained from said compartment.

7. A device according to claim 1 wherein the number of compartments is two, each compartment configured to receive a beverage container.

8. A device for actively heating and cooling a beverage in a beverage container, said device comprising:
   (a) a housing with at least one compartment that is closed at its bottom and sides and is opened at its top, said compartment configured to receive a beverage container, an intermediate portion of said compartment being composed of a thermoconductive material;
   (b) heat pump means mounted in said housing, said heat pump means having mutually exclusive heating and cooling cycles for heating and cooling a beverage in the beverage container, thermal energy being transferred between said heat pump means and the beverage container via said thermoconductive material;
   (c) heat dissipating means mounted to said housing adjacent said heat pump means;
   (d) a fan mounted to said housing for directing air at said heat dissipating means;
   (e) switch means connected to said heat pump means for selectively energizing said heat pump means into said heating and cooling cycles; and
   (f) temperature sensor means responsive to temperature changes in said compartment, sad temperature sensor means connected to said heat pump means for controlling the temperature in said compartment by selectively controlling the heating and cooling cycles as a function of the temperature in said compartment.

9. A device according to claim 8, wherein said device includes a drain and a vent at the bottom of said compartment for draining fluid in said compartment and for preventing creation of a partial vacuum when the beverage container is placed in said compartment.

10. A device according claim 9, wherein said device includes collection means connected to said drain for collecting the fluid drained from said compartment.

11. A device according to claim 9 wherein the number of compartments is two, each compartment configured to receive a beverage container.

12. A device for actively heating and cooling a beverage in a beverage container, said device comprising:
   (a) a housing with a compartment that is closed at its bottom and sides and is opened at its top, said compartment configured to receive a beverage container, an intermediate portion of said compartment being composed of a thermoconductive material;
   (b) solid state heat pump means mounted in said housing in a free-floating manner, said heat pump means having mutually exclusive heating and cooling cycles, said heat pump means heating a beverage in the beverage container when said heat pump means is in said heating cycle and cooling a beverage in said beverage container when said heat pump means is in said cooling cycle, thermal energy being transferred between said solid state heat pump means and the beverage container via said thermoconductive material;
   (c) heat dissipating means mounted to said housing adjacent said heat pump means for dissipating heat generated by said heat pump means during said heating and cooling cycles;
   (d) a fan mounted to said housing for directing air at said heat dissipating means for dissipating heat dissipated by said heat dissipating means;
   (e) switch means connected to said heat pump means for selectively energizing said heat pump means into said heating and cooling cycles;
   (f) temperature sensor means responsive to changes in temperature in said compartment, said temperature sensor means connected to said heat pump means for controlling the temperature in said compartment by selectively controlling said heating and cooling cycles as a function of the temperature in said compartment; and
   (g) a drain and vent at the bottom of said compartment for draining fluid in said compartment and for preventing creation of a partial vacuum when the beverage container is placed in said compartment.

* * * * *